United States Patent
Patel et al.

(10) Patent No.: US 9,259,978 B2
(45) Date of Patent: Feb. 16, 2016

(54) AUTOMATIC WHEEL TO TIRE PRESSURE SENSOR CORRELATION IN DISTRIBUTED ARCHITECTURE

(71) Applicant: FORD GLOBAL TECHNOLOGIES, LLC, Dearborn, MI (US)

(72) Inventors: Dilip B. Patel, Novi, MI (US); James M. Weinfurther, Farmington, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 113 days.

(21) Appl. No.: 14/318,788

(22) Filed: Jun. 30, 2014

(65) Prior Publication Data
US 2015/0375578 A1  Dec. 31, 2015

(51) Int. Cl.
B60C 23/00 (2006.01)
B60C 23/02 (2006.01)
B60C 23/04 (2006.01)

(52) U.S. Cl.
CPC .................................. *B60C 23/0418* (2013.01)

(58) Field of Classification Search
CPC ............ B60C 23/0408; B60C 23/0496; B60C 23/0433
USPC ...... 340/442, 447; 116/342, 352, 34 R, 35 R; 152/415, 418; 73/146; 370/375, 369, 370/336, 330, 326, 321, 301, 280, 263, 294, 370/314, 436; 455/171.1, 231, 181.1; 342/357.22, 357.39, 357.73, 205; 368/6, 225
See application file for complete search history.

(56) References Cited

U.S. PATENT DOCUMENTS

| | | | |
|---|---|---|---|
| 6,864,785 B2 | 3/2005 | Marguet et al. | |
| 6,882,912 B2 | 4/2005 | DiLodovico et al. | |
| 7,010,968 B2 | 3/2006 | Stewart et al. | |
| 7,111,508 B2 | 9/2006 | Desai | |
| 7,254,504 B2 | 8/2007 | Klotz et al. | |
| 7,333,468 B1 * | 2/2008 | Turullols | H03L 7/093 370/349 |
| 7,336,161 B2 | 2/2008 | Walraet | |
| 7,486,181 B2 | 2/2009 | Olsen et al. | |
| 7,916,010 B2 | 3/2011 | McQuade et al. | |
| 8,115,613 B2 | 2/2012 | Patel et al. | |
| 8,327,396 B2 * | 12/2012 | Ramaswamy | H04L 12/66 725/14 |
| 8,384,538 B2 | 2/2013 | Breed | |
| 8,395,493 B2 * | 3/2013 | Oba | B60C 23/0408 340/442 |
| 8,412,182 B2 * | 4/2013 | Moberg | H04W 36/0088 370/280 |
| 8,504,864 B2 | 8/2013 | Menon et al. | |

(Continued)

FOREIGN PATENT DOCUMENTS

JP  2009248784  10/2009

*Primary Examiner* — George Bugg
*Assistant Examiner* — Anthony D Afrifa-Kyei
(74) *Attorney, Agent, or Firm* — Raymond L. Coppiellie

(57) ABSTRACT

The wheel locations for wireless tire pressure monitoring sensors are automatically learned by comparing the timing of sensor message transmissions to directly measured wheel rotation, such as from an anti-lock brake system. In order to synchronize the data to be detected and compared across a distributed electronic system, first timestamps are applied to RF sensor messages upon reception in a receiver. Second timestamps are applied to decoded sensor data in the receiver when transmission of the data and the first timestamps to a control module begins. The control module applies third timestamps upon reception by the control module. The control module calculates sensor message times by subtracting a difference of the first and second timestamps from the third timestamp.

11 Claims, 4 Drawing Sheets

(56) References Cited

U.S. PATENT DOCUMENTS

| | | |
|---|---|---|
| 8,525,657 B2 | 9/2013 | Patel et al. |
| 8,528,393 B2 * | 9/2013 | Craig ................. B60C 23/0416 340/440 |
| 2006/0017554 A1 | 1/2006 | Stewart et al. |
| 2006/0158324 A1 | 7/2006 | Kramer |
| 2006/0259214 A1 | 11/2006 | McQuade |
| 2013/0222128 A1 * | 8/2013 | Watabe ............... B60C 23/0416 340/447 |
| 2014/0019035 A1 | 1/2014 | Fink et al. |
| 2014/0369321 A1 * | 12/2014 | Tan .................... H04W 56/001 370/336 |

* cited by examiner

AUTOMATIC WHEEL TO TIRE PRESSURE SENSOR CORRELATION IN DISTRIBUTED ARCHITECTURE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to tire pressure monitoring systems in automobiles, and, more specifically, to automatically learning to associate transmissions from identified wheel-mounted sensors with the wheel locations where the respective wheels are installed.

Monitoring of tire pressure provides a useful safety feature as the result of being able to automatically inform a driver when a low pressure appears in any tire. A typical tire pressure monitoring system (TPMS) sensor unit includes a battery-powered device that is remotely mounted on each respective wheel. Pressure data from a transducer is wirelessly transmitted (e.g., via RF) to a vehicle-mounted receiver for analyzing the transmitted messages and to associate the measurements with respective wheel locations. Each sensor unit includes a unique identifier or serial number which is included in each message that the receiver can learn to associate with respective wheel positions so that the location of a tire experiencing low pressure can be reported to the driver. Because of the possibility of tire rotation (i.e., swapping of wheel locations for evening out the tire wear) or the replacement of a tire with a spare or new tire on a different wheel, these associations must be continually re-learned during vehicle operation.

One technique for learning the wheel location for data obtained from wheel-mounted TPMS sensors involves time correlation between data received from the TPMS sensors with data received from an anti-lock brake system (ABS) that directly monitors wheel positions. More specifically, the sensor unit may include an orientation sensor such as an accelerometer in order to time the broadcasting of messages according to a particular rotational position of the wheel, such as at the top of a wheel rotation. By triggering the transmission of messages once per wheel rotation, the timing of a string of tire pressure messages can be compared with direct measurements from each of the wheel locations in the ABS data. Since tire slippage, vehicle trajectory, and other factors result in differential overall rotation between the individual wheels, timing information from each respective TP MS sensor unit eventually matches only one of the sets of corresponding ABS data measurements. This general technique for learning the wheel associations is shown in U.S. Pat. No. 7,336,161 to Walraet, U.S. Pat. No. 8,528,393 to Craig et al., and U.S. patent application publication 2014/0019035 to Fink et al., for example.

In order to reliably associate the TPMS sensor ID's with respective wheel locations within a reasonable period of time, a high accuracy of the measured time of occurrence for each TPMS sensor message is needed. In an electrical architecture wherein the TPMS data and ABS data is received and processed by the same microprocessor or microcontroller based on a single timing reference (e.g., clock), synchronization between the data sets and the overall accuracy of the timing data itself is fairly straightforward to obtain. In a typical electrical architecture of an automotive vehicle, however, a distributed architecture is employed wherein the RF receiving and decoding circuits are located in one module and the processing (e.g., comparison) of the TPMS data with the ABS data in order to find the wheel associations is performed by circuits located in a different module (e.g., a body control module). The detection and decoding of the RF messages from the TPMS sensors in the RF module may take an amount of time that varies from one message to another. When the decoded messages are repackaged and sent to the other module doing the comparison, the time at which the message arrives at the comparing module is not sufficiently accurate for purposes of the comparison because of the variable delay between the time that the sensor unit was at the reference position and the time that the comparing module receives the corresponding message. Walraet '161 discloses a shared clock signal generated in one module and coupled directly to other modules for use in detecting the times for the TPMS data and ABS data. However, the dedicated provisioning of wiring for sharing a clock signal is undesirable.

Synchronization of separate clock references with different modules over existing communication lines (such as a multiplex bus) has provided limited accuracy due to bus delays for the associated messages and due to clock drift that continues to occur between synchronization messages. Therefore, improved timing measurements are needed in the context of a distributed processing system.

SUMMARY OF THE INVENTION

In one aspect of the invention, a tire pressure monitoring system (TPMS) is provided for a vehicle with a plurality of wheel locations. A plurality of wheel-mounted TPMS sensor units transmit RF sensor messages that are triggered when the respective sensor units detect being in respective rotational positions. The system includes a TPMS receiver unit and a control module, wherein the TPMS receiver unit and the control module have independent time references. A multiplex bus is coupled between the TPMS receiver unit and the control module. An anti-lock brake (ABS) unit is coupled to the control module providing ABS wheel rotation data. The TPMS receiver unit has an RF section, a decoding section, and a bus section, wherein the receiver unit generates TPMS wheel rotation data sent to the control module as multiplex bus messages. Each bus message is comprised of an identifier for a sensor unit that transmitted a respective RF sensor message, a first timestamp triggered when the RF section received the respective RF sensor message, and a second timestamp triggered when the bus section begins to transmit a respective multiplex bus message having contents decoded by the decoding section. The control module assigns a third timestamp to each of the bus messages when received. The control module calculates an RF sensor message time for each bus message in response to subtracting a difference between the first and second timestamps from the third timestamp. The control module compares the TPMS wheel rotation data and the ABS wheel rotation data to associate each TPMS sensor unit with a respective wheel location.

DETAILED DESCRIPTION OF PREFERRED EMBODIMENTS

Figure 1:
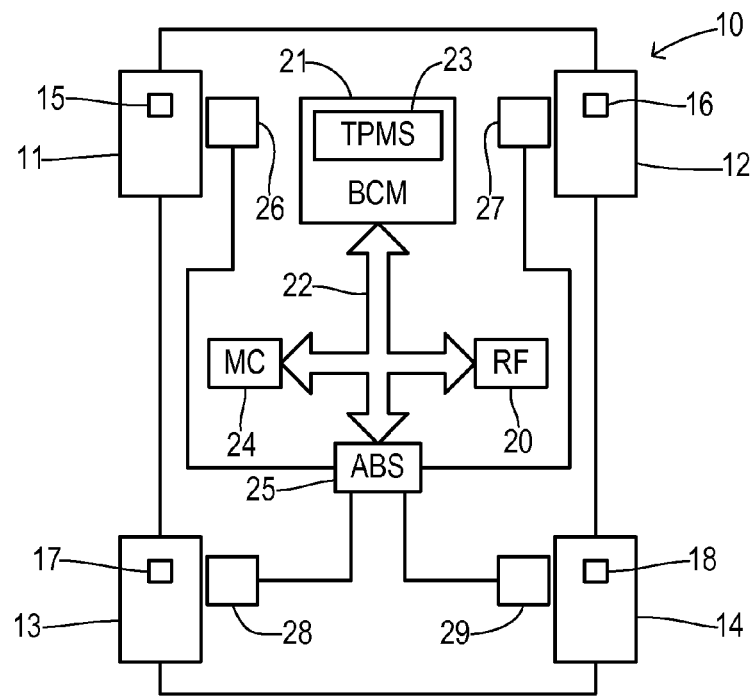
FIG. 1 is a block diagram showing an automotive vehicle and a distributed electrical architecture for implementing a tire pressure monitoring system.

Referring to FIG. 1, a vehicle 10 has a left front wheel 11, a right front wheel 12, a left rear wheel 13, and a right rear wheel 14. Each wheel location includes a tire mounted on a respective wheel containing a respective TPMS sensor unit 15-18. TPMS sensor units 15-18 transmit respective RF sensor messages to an RF module 20 mounted in vehicle 10. RF module 20 is coupled with a body control module (BCM) 21 via a multiplex bus 22. BCM 21 includes a TPMS algorithm 23 for the purpose of associating identifying serial numbers provided by sensor units 15-18 with respective vehicle locations.

Based on the pressure measurements contained in the respective sensor messages from TPMS sensor units 15-18, a tire having a pressure below a threshold pressure may generate a warning via a message center 24 which is coupled to bus 22. Based on the wheel location associations derived, the warning via message center 24 can inform the driver which wheel location contains the underinflated tire.

An anti-lock brake system (ABS) controller 25 is connected to ABS wheel units 26-29 mounted at wheels 11-14, respectively, for obtaining direct position/timing measurements for the wheels (e.g., from the respective positions of toothed wheels in position sensors mounted on each wheel).

Figure 2:
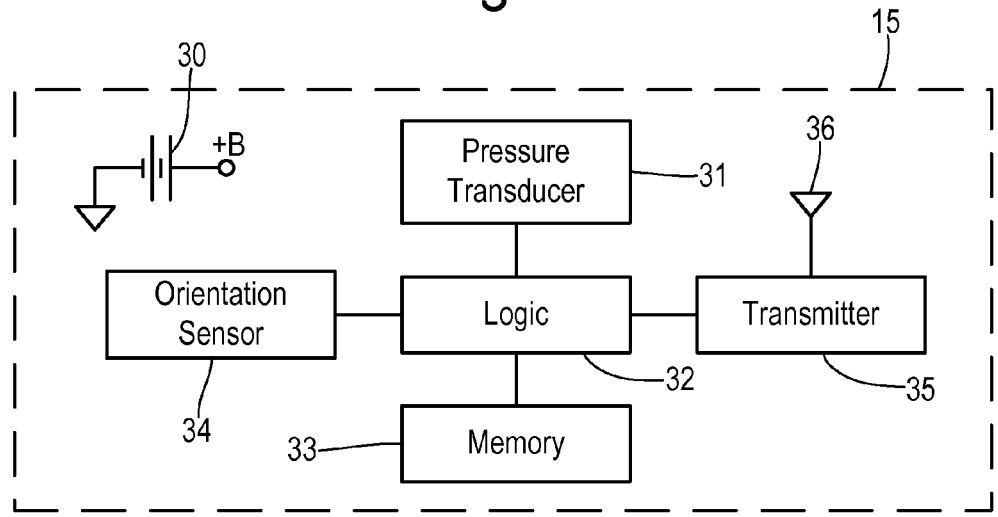
FIG. 2 is a block diagram of a TPMS sensor.

FIG. 2 shows a TPMS sensor unit 15 in greater detail. The unit is battery powered from a battery 30. A pressure transducer 31 provides pressure measurements to a logic block 32. Logic block 32 may be comprised of a microprocessor with an associated memory 33. An orientation sensor 34 is coupled to logic block 32 so that a respective rotational position (such as when TPMS sensor unit 15 reaches its highest point above the ground) triggers a transmitter 35 to send an RF sensor message over an antenna 36. The sensor message includes a sensor ID serial number and other data.

Figure 3:
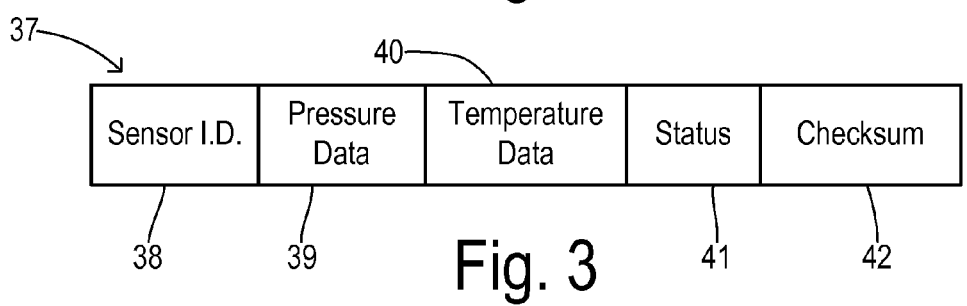
FIG. 3 illustrates the contents of an RF sensor message for transmitting wirelessly from the TPMS sensor.

FIG. 3 shows a format for a sensor message 37 which may be assembled in the sensor unit has a multi-byte message. A sensor ID 38 is followed by pressure data 39. Other sensor data may be included such as temperature data 40 and status information 41 (which may include a battery charge state, for example). A checksum 42 may also be included for error detection and correction.

Figure 4:
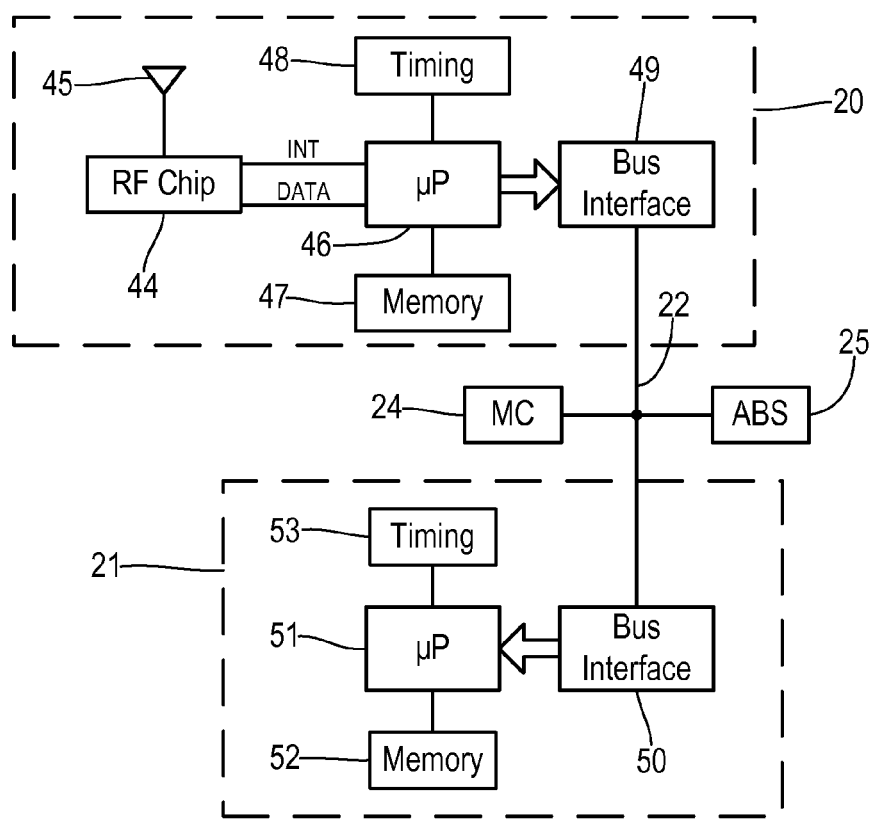
FIG. 4 is a block diagram showing an RF receiver module and a body control module in greater detail.

As shown in FIG. 4, RF receiver module 20 includes an RF detector chip 44 and an antenna 45 for receiving the RF sensor messages. The multiple bytes of each message are converted to readable data by RF chip 44 which outputs the data to a microprocessor 46. When the data becomes available, an interrupt signal is coupled to microprocessor 46 which identifies an instant in time close to the original sending time of the sensor message. Upon reception of the interrupt, microprocessor 46 uses a timing circuit 48 to obtain a timestamp which is stored in a memory 47. This critical timing information may be shared with control module 21 via a bus interface 49 which transfers a bus message from microprocessor 46 over bus 22 to a bus interface 50 in control module 21. A microprocessor 51 and memory 52 in control module 21 act upon the received bus messages and apply timing information from a timing circuit 53 to the data in each bus message as described in greater detail below.

Figure 5:
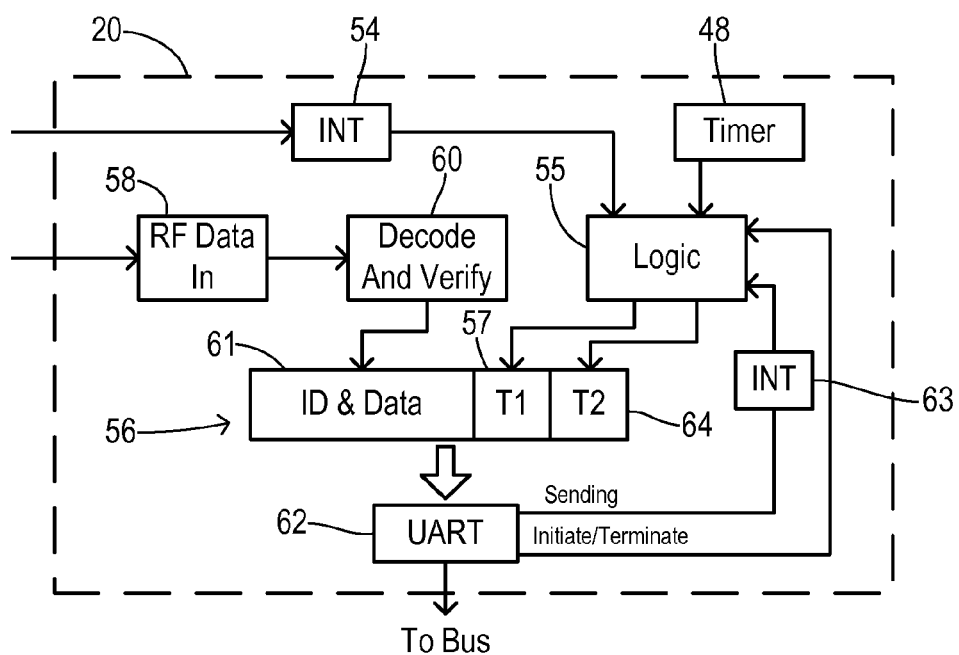
FIG. 5 is a block diagram showing message processing in the RF receiver in greater detail.

The present invention employs a series of timestamps generated in connection with each RF sensor message and the subsequent sending of a corresponding bus message in order to provide accurate timing information for each transmission from the TPMS sensor units. FIG. 5 illustrates the time stamping process in RF receiver module 20 in greater detail. An RF data in block 58 receives the RF data from the RF receiving chip as soon as a message has been detected by the RF chip. Simultaneously, an interrupt is triggered by interrupt circuit 54 and coupled to logic block 55. A memory location or buffer 56 is used to assemble a bus message corresponding to each RF sensor message received. Upon receipt of an interrupt, logic block 55 obtains a time value from timing circuit 48 to be applied as a first timestamp T1 in a multi-byte portion 57 of buffer 56. RF input data from block 58 is decoded and verified in a decoder block 60 as known in the art. The decoded data (including a sensor serial number and tire pressure data) is stored in a multi-byte portion 61 of buffer 56.

Once data portion 61 and first timestamp portion 57 have been written, steps are begun in order to transmit a corresponding bus message by initiating conversion to a bus format suitable for the multiplex bus using a universal asynchronous receiver/transmitter (UART) 62. When the conversion begins, an interrupt signal is generated by an interrupt block 63. The interrupt is handled by logic block 55 by initiating a second timestamp T2 which is obtained from timing circuit 48 and is stored in a multi-byte portion 64 of buffer 56. Timestamp T2 is written quickly enough that it is available by the time when the last bytes of buffer 56 are being converted by UART 62.

UART 62 may also process initiation messages and terminate messages from the bus sent by the main control module (e.g., the BCM) in order to begin or stop the auto-learning process. In order to avoid excessive bus loading, the auto learning process is preferably discontinued as soon as the wheel associations are obtained during each particular driving cycle.

Figure 6:
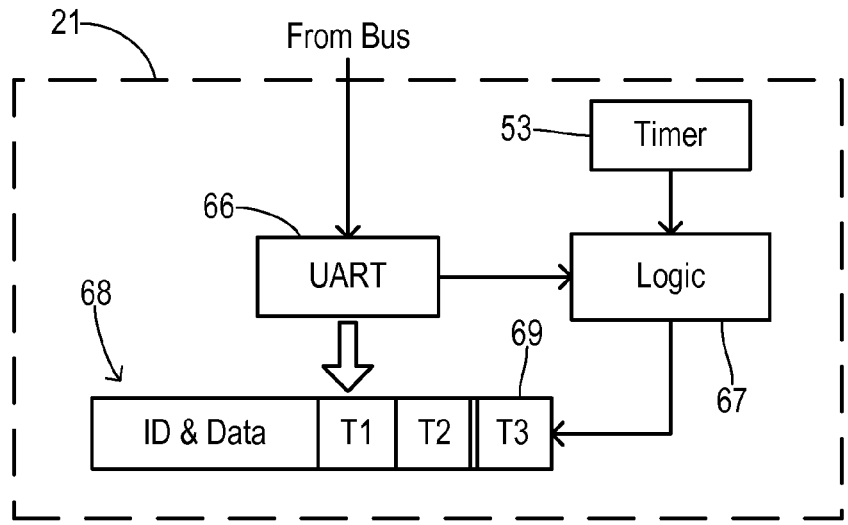
FIG. 6 is a block diagram showing message process in the body control module in greater detail.

FIG. 6 shows the elements of control module 21 that are relevant to receiving and processing the bus messages from the RF receiver module. Thus, a UART 66 receives bus messages from the bus and places the sensor ID number and data payload (e.g., timestamps T1 and T2) into a memory buffer 68. A logic block 67 (e.g., a microprocessor) determines that a new bus message with tire pressure sensor data and timing data has been received, and then applies a third timestamp T3 to a multi-byte buffer section 69 using timing information obtained from a timing circuit 53. Using timestamps T1, T2, and T3, logic block 67 calculates an RF sensor message time by subtracting the difference between timestamps T2 and T1 from third timestamp T3 (i.e., T3−(T2−T1)). The difference between timestamps T2 and T1 represents the processing delays resulting from decoding and verifying the sensor message. The time required to complete transmission of a bus message from the receiver module and store it in the control module is relatively insignificant in comparison to the processing delays that occur within the RF receiver module for decoding the message. Therefore, RF message timing based on corresponding timestamp T3 minus the difference of T2 minus T1 may be sufficiently accurate to associate the wheel locations. If additional accuracy is desired, the relatively smaller delays from bus propagation and message recognition and timestamping in the control module may be accounted for by subtracting an additional predetermined fixed offset (i.e, constant) from third timestamp T3. The resulting sensor message time is associated with (e.g., stored together with) the data from the corresponding bus message, and all the message data is organized according to the identification numbers of each transmitting TPMS sensor unit.

Figure 7:
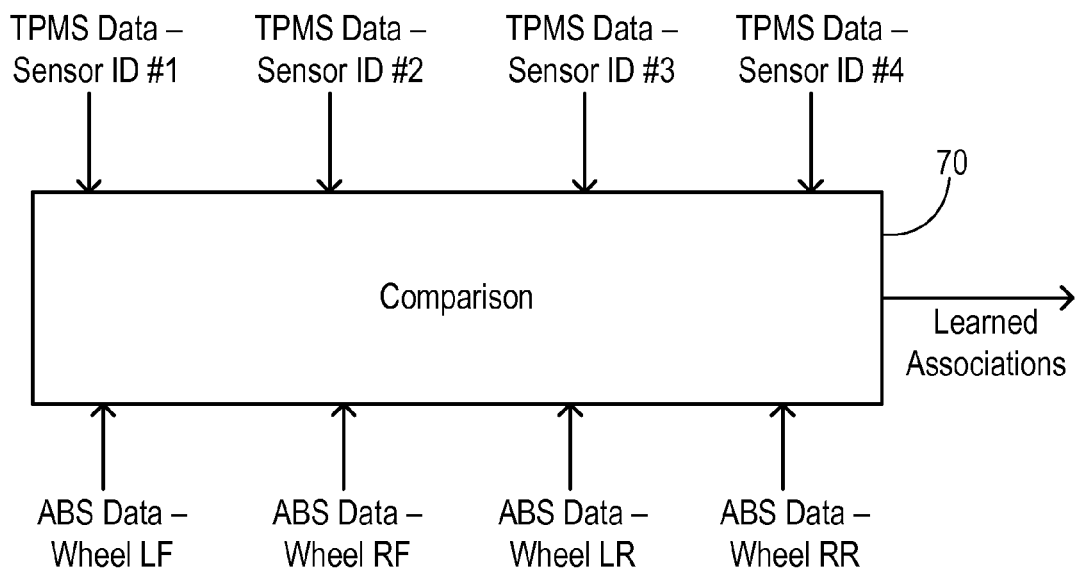
FIG. 7 illustrates the comparison of TPMS wheel rotation data with ABS wheel rotation data for associating sensor ID numbers with their corresponding wheel locations.

As shown in FIG. 7, a comparison block 70 receives the TPMS wheel rotation data organized according to the sensor identifier numbers. Similarly, ABS-based wheel rotation data for each of the wheel locations is provided to comparison block 70 which produces the learned associations as known in the art.

Figure 8:
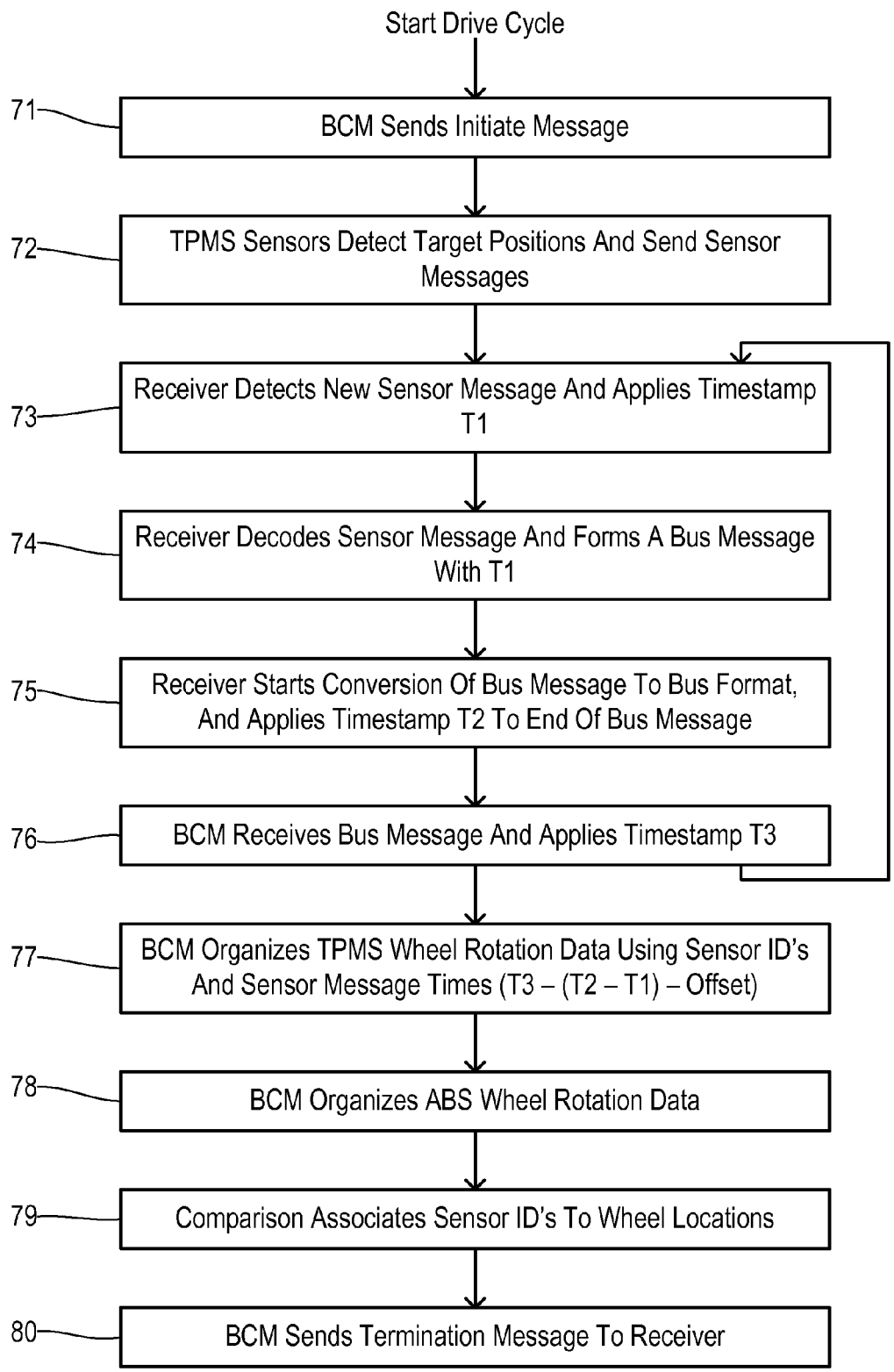
FIG. 8 is a flowchart showing one preferred method of the invention.

FIG. 8 shows a preferred method of the invention which typically begins at the start of each drive cycle (e.g., upon the starting of the vehicle engine and during subsequent movement of vehicle). The body control module (BCM) sends an initiate message to the RF receiver module in step 71. Once the learning process is initiated, the RF receiver module processes RF sensor messages from the TPMS sensor units to provide the sensor ID and message timing information needed by the BCM for learning the wheel associations. In step 72, the TPMS sensors detect predefined target positions. The transmission of sensor messages are triggered at the moment the target positions are reached. The RF receiver module detects a new incoming sensor message and then applies a first timestamp T1 in step 73. In step 74, the receiver module decodes the sensor message and forms a bus message including timestamp T1. In step 75, the RF receiver module starts conversion of the bus message into a bus format (e.g., converting from parallel bits to a serial bit string), and then applies second timestamp T2 to the end of the bus message. The BCM receives the bus message including timestamps T1 and T2 in step 76, and then applies the third timestamp T3 based on the timing reference (clock circuit) within the BCM. A return is made to step 73 for processing additional sensor messages while the auto-learning process continues.

In step 77, the BCM organizes the TPMS wheel rotation data according to the sensor IDs and the sensor message times calculated using the difference between timestamps T2 and T1. In step 78, the BCM organizes the ABS wheel rotation data for comparison with the TPMS wheel rotation data. In step 79, a comparison is utilized in order to associate the sensor ID numbers with respective wheel locations. Successive approximations may be conducted as the data accumulates until a final determination is made after enough data has been processed to converge to a solution. In step 80, the BCM sends a termination message to the receiver module in order to terminate further processing of the timing information, thereby reducing the traffic on the multiplex bus. Thereafter, the forwarding of pressure data from the continuing RF sensor messages continues so that any undesirable pressure levels can be detected.

What is claimed is:

1. A tire pressure monitoring system (TPMS) for a vehicle with a plurality of wheel locations, comprising:
   a plurality of wheel-mounted TPMS sensor units transmitting RF sensor messages that are triggered when the respective sensor units detect being in respective rotational positions;
   a TPMS receiver unit;
   a control module, wherein the TPMS receiver unit and the control module have independent time references;
   a multiplex bus coupled between the TPMS receiver unit and the control module; and
   an anti-lock brake (ABS) unit coupled to the control module providing ABS wheel rotation data;
   wherein the TPMS receiver unit has an RF section, a decoding section, and a bus section, wherein the receiver unit generates TPMS wheel rotation data sent to the control module as multiplex bus messages each comprised of an identifier for a sensor unit that transmitted a respective RF sensor message, a first timestamp triggered when the RF section received the respective RF sensor message, and a second timestamp triggered when the bus section begins to transmit a respective multiplex bus message having contents decoded by the decoding section;
   wherein the control module compares the TPMS wheel rotation data and the ABS wheel rotation data to associate each TPMS sensor unit with a respective wheel location, wherein the control module assigns a third timestamp to each of the bus messages when received, and wherein the control module calculates an RF sensor message time for each bus message in response to subtracting a difference between the first and second timestamps from the third timestamp.

2. The system of claim 1 wherein the control module calculates each RF sensor message time further in response to subtracting both the difference between the first and second timestamps and a predetermined fixed offset from the third timestamp.

3. The system of claim 1 wherein the control module sends an initiation message to the TPMS receiver unit at a beginning of a drive cycle of the vehicle when the TPMS sensor units are not associated with respective wheel locations, and wherein the TPMS receiver unit sends the TPMS wheel rotation data only after receiving the initiation message.

4. The system of claim 3 wherein the control module sends a termination message to the TPMS receiver unit after the TPMS sensor units have been associated with respective wheel locations, and wherein the TPMS receiver unit terminates sending the TPMS wheel rotation data after receiving the termination message until another initiation message is received.

5. The system of claim 1 wherein the first timestamp is captured in response to a microprocessor interrupt generated by the RF section.

6. The system of claim 1 wherein the bus section includes a universal asynchronous receiver-transmitter (UART), and wherein the second timestamp is captured when the UART begins to assemble the respective multiplex bus message.

7. A method of learning wheel locations of tire pressure monitoring system (TPMS) sensor units, comprising:
   the TPMS sensors transmitting RF sensor messages to a TPMS receiver unit, wherein the sensor messages are triggered when the respective sensor units detect being in respective rotational positions;
   the TPMS receiver generating TPMS wheel rotation data for sending to a control module in the form of multiplex bus messages each comprised of an identifier for a sensor unit that transmitted a respective RF sensor message, a first timestamp triggered when the TPMS receiver unit received the respective RF sensor message, and a second timestamp triggered when the TPMS receiver unit begins to transmit a respective multiplex bus message;
   transmitting the multiplex bus messages to the control module via a multiplex bus;
   the control module assigning a third timestamp to each of the bus messages when received;
   an anti-lock brake (ABS) unit transmitting ABS wheel rotation data to the control module;
   the control module comparing the TPMS wheel rotation data and the ABS wheel rotation data to associate each TPMS sensor unit with a respective wheel location, wherein the comparison includes calculating an RF sensor message time for each bus message in response to subtracting a difference between the first and second timestamps from the third timestamp.

8. The method of claim 7 wherein the RF sensor message time is calculated in response to subtracting both the difference between the first and second timestamps and a predetermined fixed offset from the third timestamp.

9. A method of learning wheel locations for a tire pressure sensor monitor (TPMS) system, comprising:
   applying first timestamps in a TPMS receiver to RF sensor messages upon reception from respective tire sensors identifying respective locations of respective wheels;
   applying second timestamps to decoded sensor data in the receiver;
   transmitting the sensor data and first and second timestamps to a control module;
   applying third timestamps upon reception by the control module;
   calculating sensor message times by subtracting a difference of the first and second timestamps from the third timestamp,
   directly measuring wheel positions using an anti-lock brake unit at respective sample times; and
   comparing the calculated sensor message times to the measured wheel positions and sample times to associate sensor messages to a respective wheel location.

10. The method of claim 9 wherein the calculating step includes subtracting both the difference between the first and second timestamps and a predetermined fixed offset from the third timestamp.

11. The method of claim 9 wherein the receiver and the control module operate with independent time references, and wherein a multiplex bus transmits the sensor data and first and second timestamps from the receiver to the control module.

* * * * *